United States Patent
Shin et al.

(10) Patent No.: US 9,563,368 B2
(45) Date of Patent: Feb. 7, 2017

(54) EMBEDDED MULTIMEDIA CARD AND METHOD OF OPERATING THE SAME

(71) Applicants: Myung Sub Shin, Suwon-si (KR); Jin Hyuk Kim, Hwaseong-si (KR); Jong Soon Park, Yongin-si (KR); Jun Seok Park, Seoul (KR); Hwa Seok Oh, Yongin-si (KR); Kyung Phil Yoo, Seoul (KR); Jung Pil Lee, Hwaseong-si (KR); Dae Hoon Jang, Seoul (KR); Won Churi Zoo, Seoul (KR)

(72) Inventors: Myung Sub Shin, Suwon-si (KR); Jin Hyuk Kim, Hwaseong-si (KR); Jong Soon Park, Yongin-si (KR); Jun Seok Park, Seoul (KR); Hwa Seok Oh, Yongin-si (KR); Kyung Phil Yoo, Seoul (KR); Jung Pil Lee, Hwaseong-si (KR); Dae Hoon Jang, Seoul (KR); Won Churi Zoo, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 99 days.

(21) Appl. No.: 14/592,114

(22) Filed: Jan. 8, 2015

(65) Prior Publication Data

US 2015/0199137 A1   Jul. 16, 2015

(30) Foreign Application Priority Data

Jan. 10, 2014   (KR) .................. 10-2014-0003629

(51) Int. Cl.
*G06F 12/00*   (2006.01)
*G06F 3/06*    (2006.01)
*G06F 12/02*   (2006.01)

(52) U.S. Cl.
CPC .......... *G06F 3/0611* (2013.01); *G06F 3/0659* (2013.01); *G06F 3/0679* (2013.01); *G06F 12/0246* (2013.01); *G06F 2206/1014* (2013.01)

(58) Field of Classification Search
None
See application file for complete search history.

(56) References Cited

U.S. PATENT DOCUMENTS 6,917,995 B2   7/2005   Hirose et al.
7,225,326 B2   5/2007   Bennett
(Continued)

FOREIGN PATENT DOCUMENTS

| JP | 2003-203490 | 7/2003 |
| JP | 2006-252079 | 9/2006 |
| KR | 1020100042885 A | 4/2010 |

OTHER PUBLICATIONS

"Embedded Multi-Media Card (e.MMC) Electrical Standard (5.0)," JEDEC Standard, JESD84-B50, Sep. 2013.

*Primary Examiner* — Kaushikkumar Patel
(74) *Attorney, Agent, or Firm* — Volentine & Whitt, PLLC

(57) ABSTRACT

An embedded multimedia card (eMMC) and a method of operating the same are provided. The eMMC includes a flash memory and a device controller configured to control the flash memory. The device controller includes a command storage unit configured to receive a command transmitted from a host regardless of a state of a data bus and to store task information by task ID; and a status storage unit configured to store status information based on task status by task ID.

22 Claims, 19 Drawing Sheets

(56) References Cited

U.S. PATENT DOCUMENTS

| | | | |
|---|---|---|---|
| 7,480,754 B2 | 1/2009 | Priborsky et al. | |
| 8,341,338 B2 | 12/2012 | Lee et al. | |
| 2010/0131701 A1 | 5/2010 | Fujiwara | |
| 2011/0283165 A1 | 11/2011 | Nishiyama | |
| 2012/0159016 A1 | 6/2012 | Morita | |
| 2014/0082267 A1* | 3/2014 | Yoo | G06F 3/0656 |
| | | | 711/103 |
| 2014/0089568 A1* | 3/2014 | Chung | G06F 12/0246 |
| | | | 711/103 |
| 2014/0201423 A1* | 7/2014 | Jean | G06F 12/0246 |
| | | | 711/103 |
| 2015/0074294 A1* | 3/2015 | Shacham | G06F 13/4243 |
| | | | 710/5 |
| 2015/0212738 A1* | 7/2015 | D'Eliseo | G06F 3/0604 |
| | | | 711/154 |
| 2015/0234601 A1* | 8/2015 | Tsai | G06F 3/0611 |
| | | | 711/103 |

* cited by examiner

FIG. 3

| Status | Not Ready | Not Ready | Not Ready | | | Not Ready | Not Ready | Ready | Ready |
|---|---|---|---|---|---|---|---|---|---|
| Task No. | N | N-1 | N-2 | ••• | | 4 | 3 | 2 | 1 |

313A

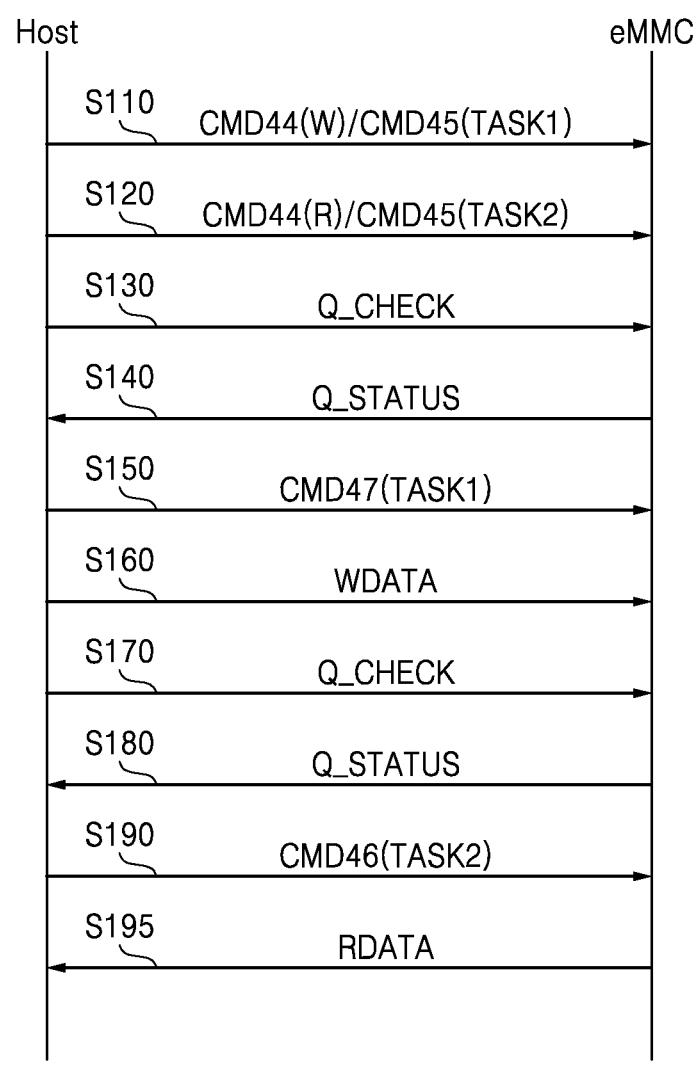

FIG. 5A

| CMD INDEX | Type | Argument | Resp | Abbreviation | Command Description |
|---|---|---|---|---|---|
| CMD44 | ac | [31] Set to 0<br>[30] DD: "1" read / "0" write<br>[29] Tag request<br>[28:25] Context ID<br>[24]: Forced programming<br>[23] Priority: "0" simple / "1" high<br>[20:16] Task ID<br>[15:0] Number of Blocks | R1 | QUEUED_TASK_PARAMS | Defines Data Direction (DD) of operation (read/write), Priority (high/simple), Task ID, and block count of queued task |
| CMD45 | ac | [31:0] data block address | R1 | QUEUED_TASK_ADDRESS | Defines the block address of queued task |
| CMD46 | adtc | [20:16] TASK ID | R1 | EXECUTE_READ_TASK | Device shall execute task from the queue whose ID is encoded in the argument |
| CMD47 | adtc | [20:16] TASK ID | R1 | EXECUTE_WRITE_TASK | Device shall execute task from the queue whose ID is encoded in the argument |
| CMD48 | ac | [20:16] TASK ID<br>[3:0] TM op-code | R1b | QUEUE_TASK_MGMT | Device Shall execute Task |
| CMD13 | ac | [31:16] RCA<br>[15] SQS<br>[14:1] stuff bits<br>[0] HPI | R1 | SEND_STATUS | In case SQS bit = 0: Addressed Device sends its status register. IF HPI flag is set the device shall interrupt its internal operations in a well defined timing.<br>In case SQS bit = 1: indicate that this is CMD13 of Command Queue. In response device shall send the QSR (Queue Status Register). In this case HPI must be set to '0'. |

FIG. 5B

| TM op-code | Description | Task ID Required? |
|---|---|---|
| 0h | Reserved | N/A |
| 1h | Discard entire queue: Device shall discard all tasks in the queue (1) and QSR shall be cleared. | No |
| 2h | Discard Task: Device shall discard designated task (2) and QSR designated task shall be cleared. | Yes |
| 3h-Fh | Reserved | N/A |

(1) If the queue is empty, device shall execute command without an error
(2) If TaskID does not exist, device shall execute command without an error

EMBEDDED MULTIMEDIA CARD AND METHOD OF OPERATING THE SAME

CROSS-REFERENCE TO RELATED APPLICATIONS

A claim for priority under 35 U.S.C. §119 is made to Korean Patent Application No. 10-2014-0003629 filed on Jan. 10, 2014, in the Korean Intellectual Property Office, the entire contents of which are hereby incorporated by reference.

BACKGROUND

Embodiments of the inventive concept relate to an embedded multimedia card (eMMC), and more particularly, to an eMMC for reducing input/output latency and a method of operating the same.

An MMC is a flash memory card standard. An eMMC is a standard for an embedded MMC defined by the Joint Electron Devices Engineering Council (JEDEC). According to the eMMC standard, communications are based on an 11-signal bus. The eMMC may be embedded in mobile communication devices, such as smart phones, for example.

SUMMARY

Various embodiments of the inventive concept provide an embedded multimedia card (eMMC) for improving read/write performance, a host for controlling the eMMC, and a method of operating the eMMC and the host.

According to aspects of the inventive concept, an embedded multimedia card (eMMC) device includes a flash memory and a device controller configured to communicate with the flash memory and a host. The device controller includes a command storage unit, a status storage unit and a task manager. The command storage unit is configured to receive and store commands from the host, regardless of a state of a data bus between the device controller and the host, the commands relating to execution of a task. The status storage unit is configured to store statuses corresponding to the tasks of the commands stored in the command storage unit. The task manager is configured to manage the command storage unit and the status storage unit for implementation of operations based on the tasks stored in the command storage unit and the corresponding statuses of the tasks stored in the status storage unit.

According to other aspects of the inventive concept, a method is provided for operating an eMMC device configured to communicate with a host. The method includes receiving a first queuing command from the host relating to a first task to be performed by the eMMC device, where the first queuing command is received regardless of a state of a data bus for communicating data between the eMMC device and the host; storing the first queuing command in a command storage unit; storing a status of the first task in a status storage unit; receiving an execution command from the host for executing the first task when the status of the first task indicates that the first task is ready for execution; and executing the first task in response to the execution command.

According to other aspects of the inventive concept, a method is provided for operating an eMMC device configured to communicate with a host. The method includes receiving queuing commands from the host relating to corresponding tasks to be performed by the eMMC device, where the queuing commands are received regardless of a state of a data bus for communicating data between the eMMC device and the host; storing the queuing commands in a command storage unit; storing statuses of the tasks, corresponding to the queuing commands, in a status register; detecting an updated status value of the statuses stored in the status register, indicating a ready status of the corresponding task of the tasks; sending a ready signal in response to the detected updated status value to the host; receiving an execution command from the host in response to the ready signal for executing the task having the ready status; and executing the task having the ready status in response to the execution command.

BRIEF DESCRIPTION OF THE DRAWINGS

Exemplary embodiments of the inventive concept will be more clearly understood from the following description taken in conjunction with the accompanying drawings, in which:

FIG. 3 is a diagram of an example of the status storage unit illustrated in FIG. 1, according to an embodiment of the inventive concept;

FIG. 4 is a flowchart of a method of operating an eMMC, according to embodiments of the inventive concept;

FIG. 5A is a table of command definitions, according to embodiments of the inventive concept;

FIG. 5B is a table showing an example of a TM op-code illustrated in FIG. 5A, according to embodiments of the inventive concept;

DETAILED DESCRIPTION OF THE EMBODIMENTS

Figure 1:
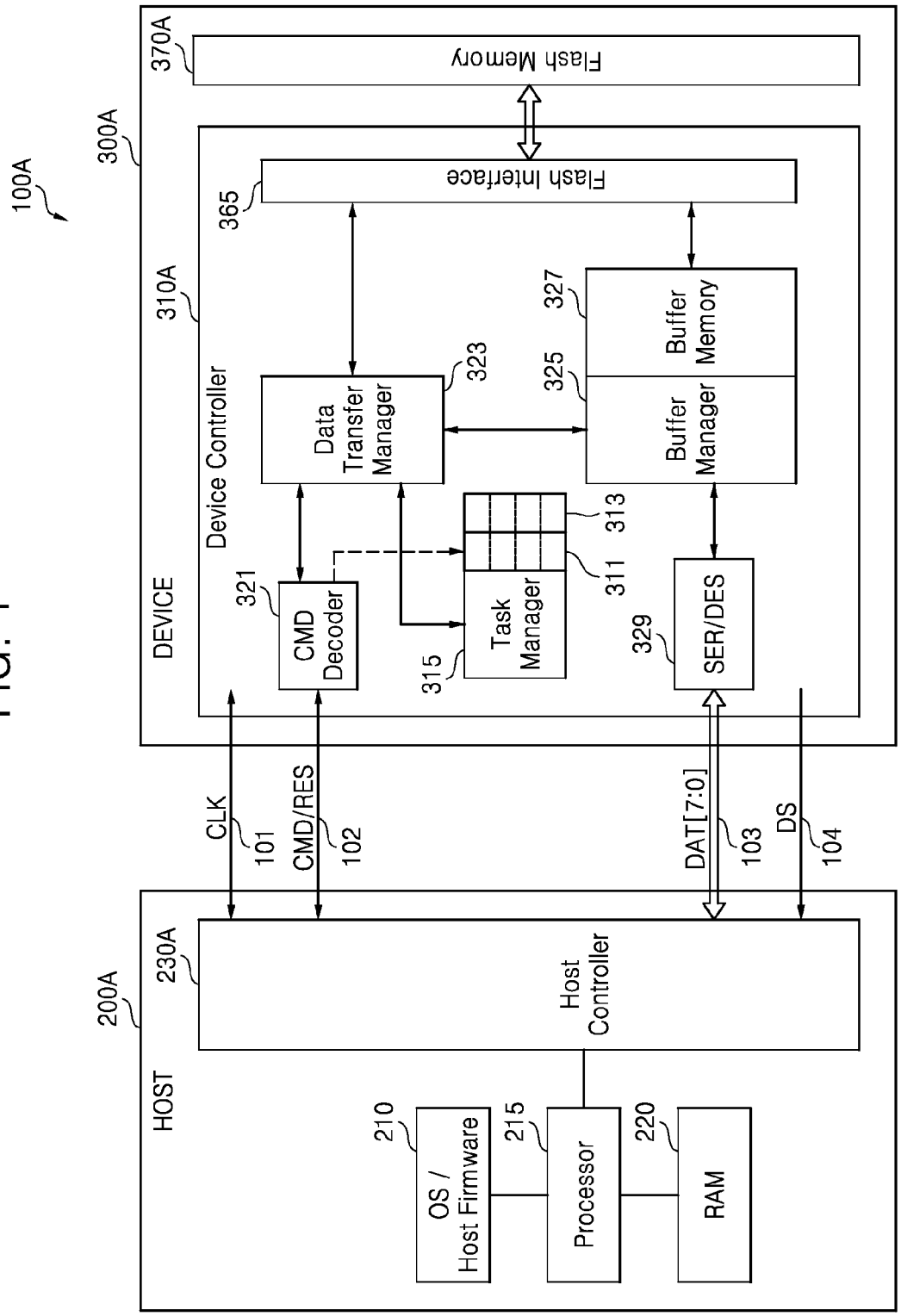
FIG. 1 is a block diagram of an embedded multimedia card (eMMC) system, according to embodiments of the inventive concept.

Embodiments will be described in detail with reference to the following description and accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to one of ordinary skill in the art. Accordingly, known processes, elements, and techniques are not described with respect to some of the embodiments. In the drawings, sizes and relative sizes of layers and regions may be exaggerated for clarity. Unless otherwise noted, like reference numerals denote like elements throughout the attached drawings and written description, and thus descriptions may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "exemplary" is intended to refer to an example or illustration.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

The embedded multimedia card (eMMC), electrical standard version 5.0, i.e., JESD84-B50 published by the Joint Electron Devices Engineering Council (JEDEC) (http://www.jedec.org) in September 2013, is hereby incorporated by reference. Accordingly, unless otherwise defined, terms and definitions used herein have the same meaning as defined in the JESD84-B50.

Various embodiments of the inventive concept may include an 11-wire bus according to JESD84-B50, as well as an additional line (or channel). Herein, a channel transmitting a signal or voltage may be a host pad, an eMMC pad, a bus, a line, a driver (including a differential amplifier in some embodiments), a receiver (including a differential amplifier in some embodiments), or a combination of at least two of the exemplary channels listed above. The functions of the channels and methods for generating a signal transmitted through the channels will be described in detail hereinafter.

Unless explicitly otherwise described with a specific intention, propagation delay of a functional circuit, such as a bus, a wire, a pad (or a pin), a driver, a receiver, and/or a differential amplifier, is not considered for the sake of convenience in the following description.

FIG. 1 is a block diagram of an eMMC system 100A, according to embodiments of the inventive concept. The eMMC system 100A includes a host 200A and a device, e.g., an eMMC 300A. The host 200A is configured to control data processing operations, such as data read operations and data write operations. The data processing operations may be performed at a single data rate (SDR) or a double data rate (DDR).

The host 200A may include a data processing device, such as a central processing unit (CPU), a processor, a microprocessor, or an application processor, which can process data. The data processing device may be embedded or implemented in an electronic device. The electronic device may be implemented as a personal computer (PC), a laptop computer, a mobile telephone, a smart phone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book, for example.

The eMMC 300A is electrically connected with the electronic device through connection means (e.g., pads, pins, buses, or communication lines) to communicate with the host 200A.

Referring to FIG. 1, the host 200A includes a processor 215, memory 220, and a host controller 230A. Operating system (OS)/host firmware 210 may be driven by the processor 215. The host 200A may also include a clock generator (not shown) and a state control unit (not shown). The clock generator generates a clock signal CLK used in the host 200A and the eMMC 300A. The clock generator may be implemented by a phase locked loop (PLL), for example.

The processor 215 may include hardware and/or software for controlling generation of a command CMD, analysis of a response RES, storing of data in a register, e.g., an extended (EXT)_CSD register (not shown), of the eMMC 300A, and/or data processing. The processor 215 may drive the OS/host firmware 210 to perform these operations.

The host controller 230A interfaces with the eMMC 300A. For example, the host controller 230A is configured to issue the command CMD to the eMMC 300A, receive the response RES to the command CMD, transmit write data to the eMMC 300A, and receive read data from the eMMC 300A.

The eMMC buses between the host controller 230a and a device controller 310A illustrated in FIG. 1 include eleven conventional buses, indicated by reference numbers 101, 102, 103 and 104 (for example, defined in eMMC 5.0), discussed below. However, embodiments of the inventive concept are not restricted thereto. For instance, the eMMC buses may include only ten buses, e.g., excepting data strobe bus 104.

Clock bus 101 transmits the clock signal CLK from the host 200A to the eMMC 300A. Bidirectional command bus 102 transmits the command CMD from the host 200A to the eMMC 300A and transmits the response RES to the command CMD from the eMMC 300A to the host 200A. Bidirectional data bus 103 transmits write data DAT[7:0] for data write operations from the host 200A to the eMMC 300A, and transmits read data DAT[7:0] for data read operations from the eMMC 300A to the host 200A. The data strobe bus 104 transmits a data strobe signal DS from the eMMC 300A to the host 200A. The data strobe signal DS may be a clock signal synchronized with data transmitted from the eMMC 300A to the host 200A, for example.

The host 200A may transmit a hardware reset signal to the eMMC 300A through a reset line (not shown). The host 200A also may generate operating voltages necessary for the operations of the eMMC 300A, and transmit the operating voltages to the eMMC 300A.

In the depicted embodiment, the eMMC 300A includes a device controller, e.g., an eMMC controller 310A and a flash memory 370A. The eMMC controller 310A includes a command storage unit 311 and a status storage unit 313. The eMMC controller 310A may also include a task manager 315, a command decoder 321, a data transfer manager 323, a buffer manager 325, a buffer memory 327, a serializer/deserializer (SER/DES) 329, and a flash interface 365.

The command decoder 321 is configured to decode commands received from the host 200A, to store commands from among the decoded commands in the command storage unit 311 when they are commands that are supposed to be stored in the command storage unit 311 (e.g., a task set command CMD44 or a task address command CMD45), and to transmit the other commands to the data transfer manager 323. The commands to be stored in the command storage unit 311 may be issued from the host 200A to the eMMC 300A regardless of the state of the data bus 103. The state of the data bus 103 may be an idle state, a data transmission state, a data reception state, or a busy state, for example.

The task manager 315 is configured to store task information per task ID in the command storage unit 311 with respect to a particular command among the commands received from the host 200A. The status storage unit 313 stores a status of a task stored in the command storage unit 311. Generally, each task includes a queuing command and an execution command. For example, the queuing command may include a task set command and a task address command, and the execution command may include at least one of an execute read operation, an execute write operation, a queue management operation and a send status operation, as discussed below.

The task manager 315 manages the command storage unit 311 and the status storage unit 313. The task manager 315 may efficiently manage data through the data transfer manager 323 based on tasks stored in the command storage unit 311. The task manager 315 may also manage the status of each task through the status storage unit 313 and is thus able to actively send the host 200A information about a ready task that is ready for execution at the request of the host 200A or regardless of the request of the host 200A. The task manager 315 may manage preparation or parallel processing of multiple (at least two) tasks stored in the command storage unit 311.

The buffer memory 327 stores data received from the host 200A or data to be transmitted to the host 200A. The buffer manager 325 manages the buffer memory 327. For instance, the buffer manager 325 may receive data corresponding to a task stored in the command storage unit 311 from the host 200A and temporarily store the data in the buffer memory 327. The buffer manager 325 may also temporarily store data read from the flash memory 370A in the buffer memory 327 before transmitting the data to the host 200A.

The data transfer manager 323 manages data transfer between the host 200A and the eMMC 300A. For instance, the data transfer manager 323 may manage in association with the task manager 315 so that data corresponding to a ready task is transmitted to the host 200A or is received from the host 200A. The flash interface 365 interfaces with the flash memory 370A.

Serial data received from the host 200A through the data bus 103 may be converted into parallel data by the SER/DES 329, stored in the buffer memory 327, and then stored in the flash memory 370A through the flash interface 365. Data read from the flash memory 370A may be stored in the buffer memory 327 through the flash interface 365, converted into serial data by the SER/DES 329, and then transmitted to the host 200A through the data bus 103.

A normal write command or read command may be decoded by the command decoder 321 and then directly transmitted to the data transfer manager 323, which manages data processing or data flow with respect to the command. However, as for a task stored in the command storage unit 311, the task manager 315 communicates with the data transfer manager 323 and performs an operation necessary for data processing for a task that has not been completed or prepares data using an interleaving operation of the flash memory 370A, thereby enabling parallel processing. Therefore, performance (e.g., write or read operation performance) of the eMMC 300A can be increased.

Figure 2:
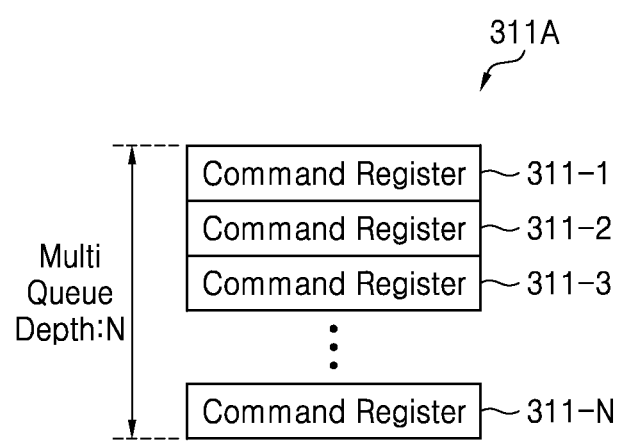
FIG. 2 is a diagram of an example of a command storage unit illustrated in FIG. 1, according to an embodiment of the inventive concept.

FIG. 2 is a diagram of an example of the command storage unit 311 illustrated in FIG. 1, indicated in FIG. 2 as command storage unit 311A, according to an embodiment of the inventive concept. Referring to FIG. 2, the command storage unit 311A includes a plurality of (i.e., at least two) command registers, illustrated as representative first through N-th command registers 311-1 through 311-N, where N is a natural number greater than or equal to 2 that indicates the size (i.e., the number) of command registers. Here, N is defined as a multi-queue depth.

The eMMC controller 310A may receive commands corresponding to a maximum multi-queue depth N from the host 200A and store the commands in the command registers 311-1 through 311-N. Each of the command registers 311-1 through 311-N may store task information including a task ID, transfer direction information, a data size, and a start address, for example. The task information may also include priority information. The task information may be contained as an argument in a command transmitted from the host 200A to the eMMC 300A, as described below.

The task manager 315 is configured to control the order of executing tasks by controlling the data transfer manager 323, for example, using the priority information and/or transfer direction information of the tasks. For instance, the task manager 315 may control the order of execution such that a task with a higher priority is executed before another task with a lower priority, or such that a read task is executed before to a write task.

FIG. 3 is a diagram of an example of the status storage unit 313 illustrated in FIG. 1, according to an embodiment of the inventive concept. Referring to FIG. 3, the status storage unit 313 may be implemented as status register 313A. The status register 313A stores the status corresponding to each task stored in the command storage unit 311A. The task manager 315 manages the command registers 311A and the status register 313A.

The task manager 315 manages the command storage unit 311A and the status register 313A. When task information is stored in any of the command registers 311-1 through 311-N of the command storage unit 311A, that is, any of the command registers 311-1 through 311-N is occupied, it is managed by the task manager 315. The task manager 315 updates the status register 313A with "ready" information after completing an internal operation necessary for execution of the tasks stored in the command storage unit 311A.

More particularly, the status register 313A stores N-bit status information. First through N-th bits stored in the status registers of the status register 313A indicate the status of tasks (referred to herein as first through N-th tasks for the sake of convenience), respectively, stored in the respective first through N-th command registers 311-1 through 311-N. For instance, the first bit (e.g., least significant bit (LSB)) indicates whether the first task is ready for execution (hereinafter, referred to as a "ready" status) or is not ready for execution (hereafter, referred to as a "not-ready" status), and the N-th bit (e.g., most significant bit (MSB)) indicates whether the N-th task is in the ready status or the not-ready status.

The initial values stored in the status register 313A may be all "0," for example. When one of the first through N-th tasks is in the ready status, a bit in the status register 313A corresponding to that task is changed to "1." The task manager 315 checks the status of each of tasks stored in the command storage unit 311A, and updates a corresponding bit in the status register 313A. Of course, the initial status values may be "1" and the ready status values may be "0" without departing from the scope of the present teachings.

Further, although the present embodiment provides a single bit in the status register 313A being mapped to each task, it is understood that two or more bits may be mapped to each task in other embodiments, without departing from the scope of the present teachings. In other words, the status of each task may be represented by a plurality of (i.e., at least two) bits. For instance, two bits may be allocated for each task, so that the task can be expressed as one of four statuses, e.g., idle, busy, ready and error statuses. Likewise, the number of bits for the status of each task may be extended to three or more.

Although the command storage unit 311A is shown implemented using the command registers 311-1 through 311-N and the status storage unit 313 is implemented using the status register 313A in the embodiments illustrated in FIGS. 2 and 3, the inventive concept is not restricted to these configurations. For instance, the command storage unit 311 alternatively may be implemented using a queue or slot, or as memory such as static random access memory (SRAM) or dynamic random access memory (DRAM). Commands received from the host 200A may be sequentially stored in the command storage unit 311A, but tasks may be executed in a different order in which the commands are stored. For instance, the order of executing tasks may be determined according to the priority of the tasks, respectively.

FIG. 4 is a flowchart of a method of operating the eMMC 300A, according to embodiments of the inventive concept. FIG. 5A is a table defining commands according to embodiments of the inventive concept. The commands defined in FIG. 5A are new commands that have not been defined in the conventional eMMC specification (i.e., eMMC5.0), and may be generally described as queuing commands (e.g., CMD44, CMD45) and execution commands (e.g., CMD46, CMD47, CMD48, CMD13). FIG. 5B is a table showing an example of a TM op-code illustrated in FIG. 5A. Each command includes an argument in predetermined length (e.g., 32 bits) and is issued from the host 200A to the eMMC 300A. The method may be performed by the eMMC system 100A illustrated in FIG. 1, for example.

Referring to FIGS. 4, 5A, and 5B, the host 200A transmits a first queuing command comprising a task set command CMD44 and a task address command CMD45 as a first task TASK1 to the eMMC 300A in operation S110. The host 200A may transmit the task set command CMD44 and the task address command CMD45 to the eMMC 300A even while previous data is being transmitted through the data bus 103.

The task set command CMD44 is a command for setting the ID of a task and the operating direction (direction information W) of the task. The operating direction is the transfer direction of data. For example, the task set command CMD44 may include a task ID, a data direction DD indicating the data transfer direction, and size information (i.e., the number of blocks) designating the size of data to be written to a flash memory or data to be read from the flash memory in an argument, such as a 32-bit argument.

In some embodiments, among the 32-bit argument of the task set command CMD44, the lower 16 bits [15:0] may represent the data size with the number of blocks, the following lower 5 bits [20:16] may represent the task ID, the bit [23] may represent priority, and the bit [30] may represent the data direction DD. Here, a block is a unit of data having a predetermined size and may be a page of the flash memory or a multiple of a page, although embodiments of the inventive concept are not restricted to these examples.

In the depicted example, the bit [30] being set to "0" indicates that the current task is a write task for storing data in the eMMC 300A. The bit [30] being set to "1" indicates that the current task is a read task for reading data from the eMMC 300A. In various embodiments, the write task and the read task are identified by different settings in the argument of one command CMD44. However, a command for the write task and a command for the read task may be defined separately in other embodiments. Also, in various embodiments, the priority is represented using one bit, i.e., the priority bit [23]. However, the priority may be represented using two or more bits in other embodiments.

The task address command CMD45 may include start address information (e.g. data block address in FIG. 5A) indicating the start address of data corresponding to the current task. The start address may be logical address. For instance, when the task is the write task, the start address information designates the start address of data to be written to the flash memory 370A. When the task is the read task, the start address information designates the start address of data to be read from the flash memory 370A. For instance, when the task is the read task, the start address is 100 and the data size is 10, the task includes reading 10 blocks of data starting from address 100.

Although the task address command CMD45 including the start address information is defined separately from the task set command CMD44 in the embodiments, it is understood that the data size information and the start address information may be included together in one command or the other, e.g., in the task set command CMD44, in alternative embodiments.

The eMMC 300A may receive a command from the host 200A and store task information in the command storage unit 311A by task ID. For instance, the eMMC 300A receives the task set command CMD44 for the first task TASK1 from the host 200A and stores task information about the first task TASK1 in one (e.g., first command register 311-1) of the command registers 311-1 through 311-N in the command storage unit 311A. Commands received from the host 200A may be sequentially stored in the command storage unit 311A, although the tasks may not necessarily be executed in order in which the commands have been stored. For instance, the execution order of tasks may be determined according to the respective priorities of the tasks.

The eMMC 300A may also receive the task address command CMD45 for the first task TASK1 from the host 200A, and store the start address information in the command register, e.g., first command register 311-1, corresponding to the first task TASK1.

The host 200A transmits a second queuing command comprising the task set command CMD44 and the task address command CMD45 for another task, i.e., a second task TASK2, to the eMMC 300A in operation S120. The task set command CMD44 and the task address command CMD45 for the task may be transmitted before transmitting and/or receiving data in response to the first task TASK1 to or from the eMMC 300A. The eMMC 300A may receive the task set command CMD44 for the second task TASK2 from the host 200A and store task information about the second task TASK2 in another one (e.g., second command register 311-2) of the command registers 311-1 through 311-N in the command storage unit 311A. The eMMC 300A may also receive the task address command CMD45 for the second task TASK2 from the host 200A and store start address information in the command register, e.g., second command register 311-2, corresponding to the second task TASK2. In the embodiment illustrated in FIG. 4, the first task TASK1 is a write task and the second task TASK2 is a read task, although the inventive concept is not restricted to the this implementation.

Thereafter, the host 200A sends the eMMC 300A a status check command Q_CHECK for checking a status in the status register 313A in operation S130. The status check command Q_CHECK is defined to check the ready status of a task stored in each of the command registers 311-1 through 311-N. As shown in FIG. 5A, the host 200A may use CMD13 as the status check command Q_CHECK. For instance, a predetermined bit (e.g., bit [15]) in an argument of CMD13 may be set to "1" to use CMD13 as the status check command Q_CHECK.

In response to the status check command Q_CHECK, the eMMC 300A sends the host 200A a status response message Q_STATUS, including values in the status register 313A, in operation S140. The host 200A detects the ID of a task that has been ready for execution in the status response message Q_STATUS. The status response message Q_STATUS may include an argument of 32 bit values of the status register 313A. Among the 32 bit values of the status register 313A, value "1" may indicate a ready task. The host 200A may identify tasks corresponding to value "1" among the bits of the status storage unit 313A.

Once the host 200A confirms that the first task TASK1 is ready from the status response message Q_STATUS received in operation S140, the host 200A sends the eMMC 300A an execution command, such as a write execution command CMD47, for the first task TASK1 in operation S150, and transmits write data WDATA related to the first task TASK1 to the eMMC 300A in operation S160. In response to the write execution command CMD47, the eMMC 300A receives and stores the write data WDATA in the buffer memory 327, and sends a program command to the flash memory 370A so that the write data WDATA stored in the buffer memory 327 is programmed to the flash memory 370A.

The host 200A may periodically or non-periodically send the status check command Q_CHECK to the eMMC 300A in order to check the status of the status register 313A. For example, the host 200A sends the status check command Q_CHECK to the eMMC 300A in operation S170. In response to the status check command Q_CHECK, the eMMC 300A sends the host 200A the status response message Q_STATUS including the values of the status register 313A in operation S180.

Once the host 200A confirms that the second task TASK2 is ready from the status response message Q_STATUS received in operation S180, the host 200A sends the eMMC 300A another execution command, such as a read execution command CMD46, for the second task TASK2 in operation S190. In response to the read execution command CMD46, the eMMC 300A transmits read data RDATA related to the second task TASK2 to the host 200A in operation S195.

Referring to FIG. 5A, other illustrative execution commands include a task management command CMD48 for managing tasks and a send status command CMD13 for checking status in the status register, as mentioned above. The task management command CMD48 is defined to manage or control tasks stored in the command storage unit 311. The task management command CMD48 may cancel a particular task or all tasks. The task management command CMD48 may also be used to re-execute, i.e., retry a particular task.

The task management command CMD48 may include a task ID and a task management code, i.e., TM op-code, in an argument. Bits [3:0] may be allocated for the TM op-code, but the inventive concept is not restricted thereto.

Referring to FIG. 5B, when the TM op-code is set to "1h", all tasks stored in the command storage unit 311 are cancelled or discarded. When the TM op-code is set to "2h", only a particular task (e.g., a task corresponding to a task ID included in the task management command CMD48) among all tasks stored in the command storage unit 311 is discarded. Other values of the TM op-code are reserved in the embodiments illustrated in FIG. 5B, but each of the values may be defined to designate a particular managing operation. Consequently, the task management command CMD48 may be used to manage or control at least one task, such as to re-execute a particular task or to change the priority of the task.

The commands CMD44 and CMD45 may be paired for a single task, issued to the eMMC 300A regardless of data transfer, and stored in the command storage unit 311. When a task that is ready among tasks stored in the command storage unit 311 is a read task, the task may be designated and a read operation may be executed using CMD46. When the task that is ready is a write task, the task may be designated and a write operation may be executed using CMD47.

Figure 6:
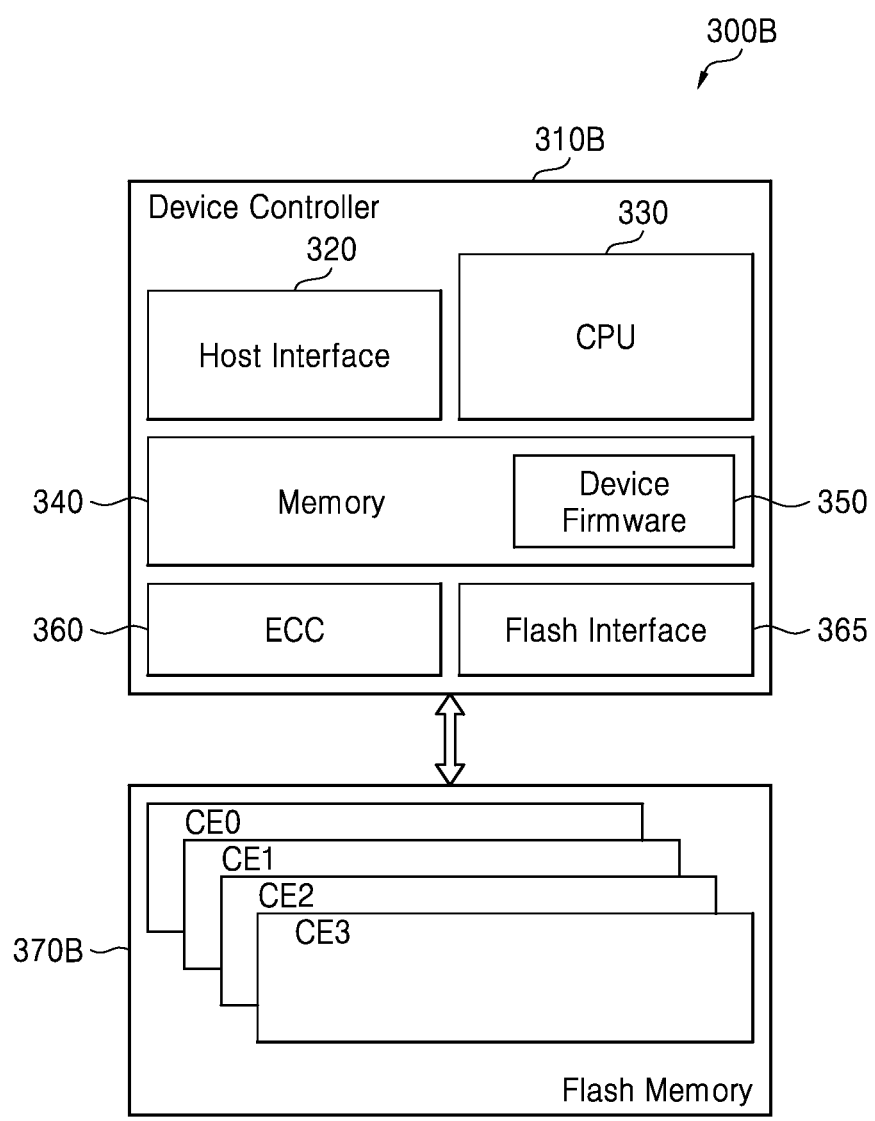
FIG. 6 is a block diagram of an eMMC, according to embodiments of the inventive concept.

FIG. 6 is a block diagram of an eMMC 300B, according to embodiments of the inventive concept. Referring to FIG. 6, the eMMC 300B includes a device controller, e.g., an eMMC controller 310B, and a flash memory 370B.

The eMMC controller 310B controls data communication between the host 200A (not shown in FIG. 6) and the flash memory 370B. The eMMC controller 310B includes an eMMC host interface 320, a CPU 330, a memory 340, an error correction code (ECC) block 360, and the flash interface 365.

The eMMC host interface 320 receives the clock signal CLK and the command CMD from the host 200A, analyzes the command CMD, and generates the response RES according to the result of the analysis. The eMMC host interface 320 transmits the response RES and data generated based on the response RES to the host 200A.

The CPU 330 controls the operations of the eMMC host interface 320 and the flash interface 365, and controls the overall operation of the eMMC 300B.

In various embodiments, the eMMC host interface 320 may include the command storage unit 311 and the status storage unit 313, discussed above. In other embodiments, the command storage unit 311 and the status storage unit 313 may be implemented in the memory 340.

The memory 340 temporarily stores data transferred between the eMMC host interface 320 and the flash interface 365. The memory 340 may be implemented using non-volatile memory, for example. The memory 340 may include read data related to a task, write data, and/or device firmware 350. The device firmware 350 may be stored in the memory 340 and executed by the CPU 330. The task manager 315 may be implemented as part of the device firmware 350 in other embodiments.

The ECC block 360 detects errors in data read from the flash memory 370B, and corrects the detected errors.

The flash memory 370B stores data. When the flash memory 370B is implemented using NAND flash memory, for example, the flash interface 365 may be implemented as a NAND flash interface. The flash memory 370B may include an EXT_CSD register (not shown) that stores device properties and selected modes.

In the depicted embodiment, the flash memory 370B includes a plurality of memory elements CE0 through CE3. Although four memory elements CE0 through CE3 are illustrated in FIG. 6, it is understood that embodiments of the inventive concept are not restricted thereto. The flash memory 370B may have a structure that supports at least two channels.

The host 200A may issue a SEND_EXT_CSD command (=CMD8) to read the EXT_CSD register of the flash memory 370B. The eMMC 300B transmits as a data block the EXT_CSD register, which may be 512 bytes in length, for example. The multi-queue depth N may be set in a reserved field of the EXT_CSD register.

Figure 7:
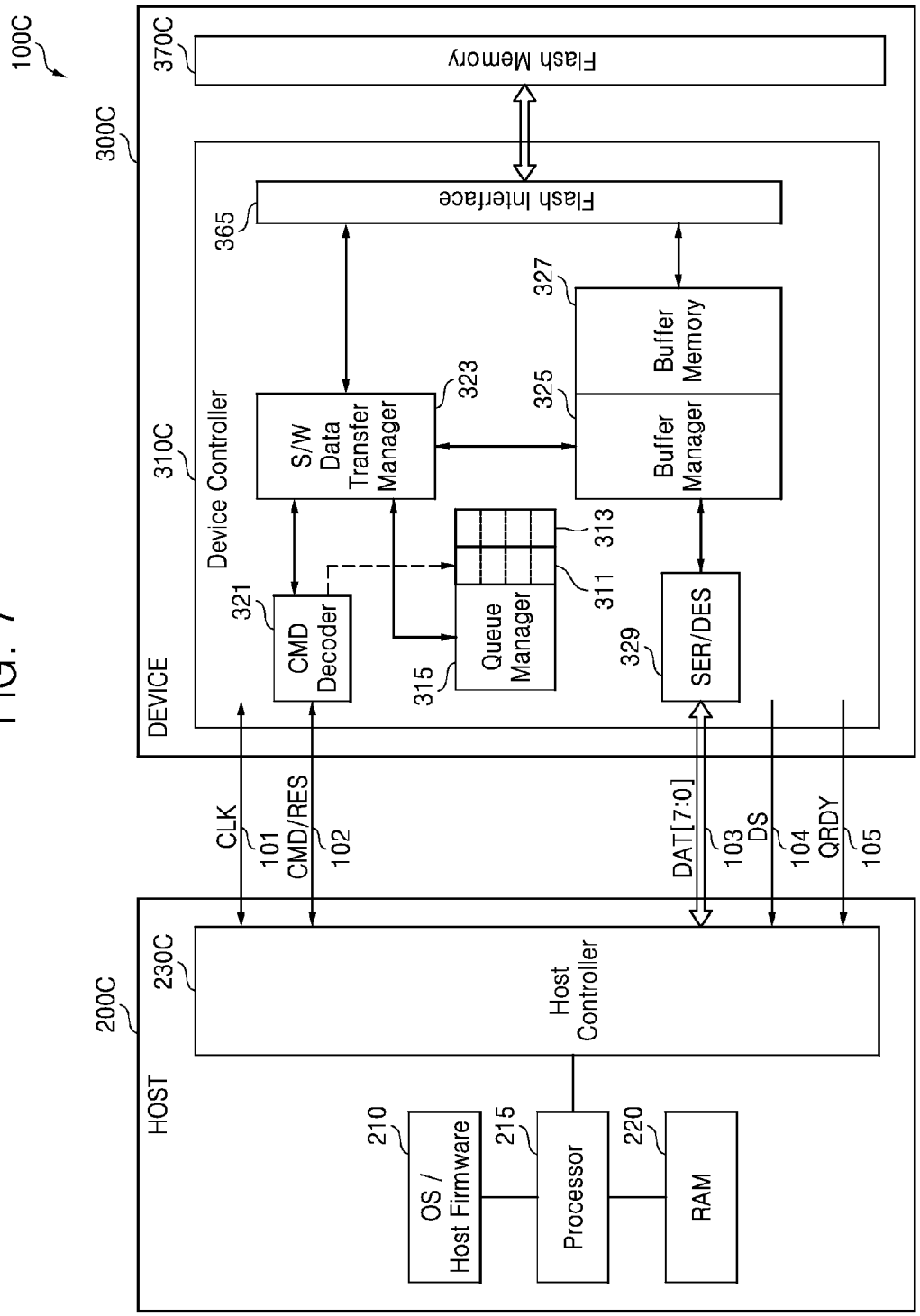
FIG. 7 is a block diagram of an eMMC system, according to other embodiments of the inventive concept.

FIG. 7 is a block diagram of an eMMC system 100C, according to other embodiments of the inventive concept. Referring to FIG. 7, the eMMC system 100C includes a host 200C and a device, e.g., an eMMC 300C. The eMMC system 100C is similar to the eMMC system 100A illustrated in FIG. 1. Thus, the following discussion focuses mainly on the differences between the systems 100A and 100C to avoid redundancy.

As compared to the eMMC system 100A illustrated in FIG. 1, the eMMC system 100C illustrated in FIG. 7 further includes a ready signal channel 105 for communicating a ready signal QRDY. When the status storage unit 313 is updated, the host 200C is informed of this update through the ready signal channel 105.

The task manager 315 updates the status storage unit 313 with "ready" information regarding a task for which a necessary internal operation is completed. That is, the "ready" information indicates a task ready for execution among the tasks stored in the command storage unit 311. The task manager 315 also sends the ready signal QRDY to the host 200C to inform the host 200C that the status storage unit 313 has been updated, accordingly.

Figure 8:
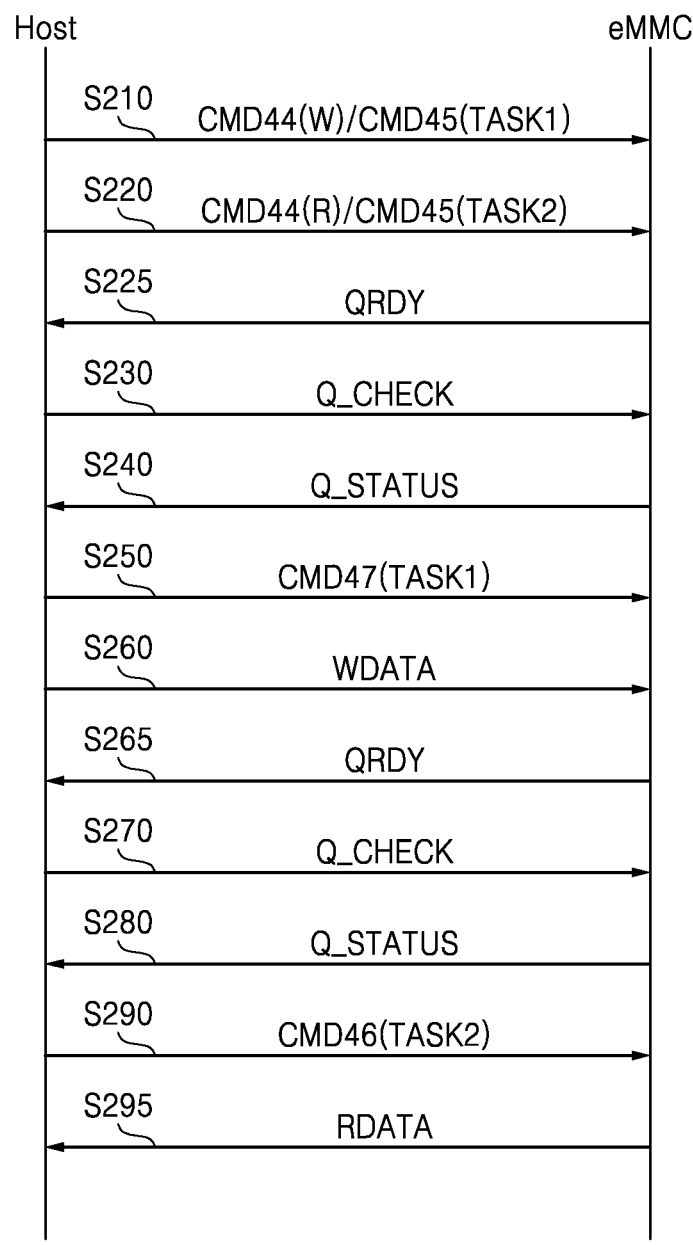
FIG. 8 is a flowchart of a method of operating an eMMC, according to embodiments of the inventive concept.
Figure 10:
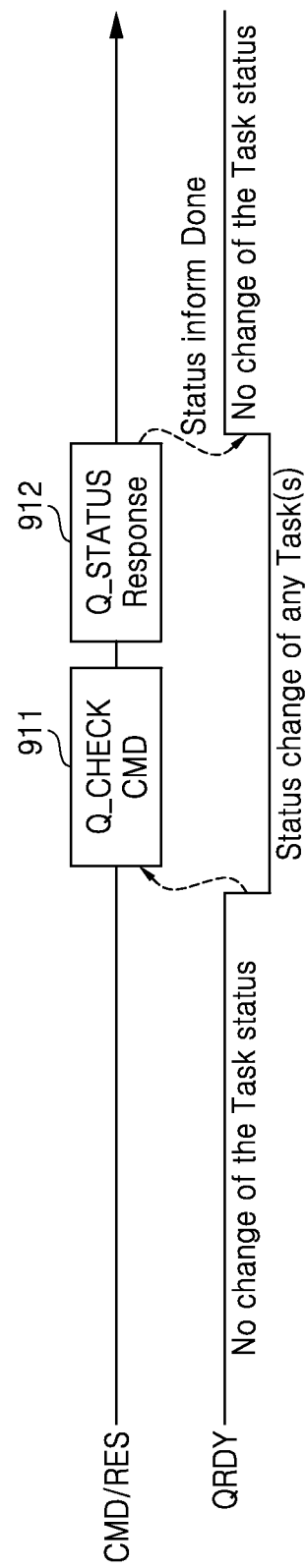
FIG. 10 is a timing chart of a ready signal, a command, and a response, according to embodiments of the inventive concept.

FIG. 8 is a flowchart of a method of operating the eMMC 300C, according to embodiments of the inventive concept. FIG. 10 is a timing chart showing the ready signal QRDY, the command CMD, and the response RES according to embodiments of the inventive concept. The method illustrated in FIG. 8 may be performed by the eMMC system 100C illustrated in FIG. 7.

Referring to FIGS. 8 and 10, the host 200C transmits a first queuing command including the task set command CMD44 and the task address command CMD45 for the first task TASK1 to the eMMC 300C in operation S210. At this time, the host 200C may transmit the task set command CMD44 and the task address command CMD45 to the eMMC 300C regardless of the state of the data bus 103. For example, the task set command CMD44 and/or the task address command CMD45 may be transmitted even while previous data is being transmitted through the data bus 103.

The task set command CMD44 may include a task ID of the first task TASK1, transfer direction information W of the first task TASK1, and data size information of the first task TASK1. The task set command CMD44 may also include priority information of the first task TASK1.

The task address command CMD45 may include start address information for the first task TASK1, which may be a logical address. For example, the first task TASK1 may be a write task, and therefore the start address information designates a start address of data to be written to the flash memory.

The eMMC 300C receives the task set command CMD44 for the first task TASK1 from the host 200C, and stores task information about the first task TASK1 in a command register (e.g., command register 311-1) of the command registers 311-1 through 311-N in the command storage unit 311A. The eMMC 300C also receives the task address command CMD45 for the first task TASK1 from the host 200C, and stores the start address information in the command register (e.g., command register 311-1) corresponding to the first task TASK1.

The host 200C also transmits the task set command CMD44 and the task address command CMD45 for the second task TASK2 to the eMMC 300C in operation S220 before transmitting data (i.e., the write data WDATA) for the first task TASK1 to the eMMC 300C. Then, the eMMC 300C receives the task set command CMD44 for the second task TASK2 from the host 200C, and stores task information about the second task TASK2 in another one of the command registers (e.g., command register 311-2) of the command registers 311-1 through 311-N in the command storage unit 311A. The eMMC 300C also receives the task address command CMD45 for the second task TASK2 from the host 200C, and stores start address information in the command register (e.g., command registers 311-2) corresponding to the second task TASK2.

The task manager 315 of the eMMC 300C checks the status of each of the tasks stored in the command storage unit 311A and updates the status register 313A. For instance, all bit values of the status register 313A initially is set to "not-ready" (e.g., "0"). When the status of the first task TASK1 changes, for example, then a bit corresponding to the first task TASK1 in the status register 313A is updated to "ready" (e.g., "1").

When at least one bit in the status register 313A is set to "ready" (e.g., "1"), the eMMC 300C drives the ready signal QRDY at a low level in operation S225. For instance, the ready signal QRDY is maintained at a high level while there is no change in the status register 313A, and is transitioned to a low level when the status register 313A is updated.

The host 200C receives and identifies the ready signal QRDY at the low level, and transmits the status check command Q_CHECK (911 in FIG. 10) to the eMMC 300C in operation S230 to determine which bit has been updated in the status register 313A. In response to the status check command Q_CHECK, the eMMC 300C transmits the status response message Q_STATUS (912 in FIG. 10), which includes values of the status register 313A, to the host 200C in operation S240. The host 200C detects an ID of a ready task from the status response message Q_STATUS.

Once the host 200C confirms that the first task TASK1 is ready based on the status response message Q_STATUS received in operation S240, the host 200C sends the eMMC 300C a first execution command including the write execution command CMD47 for the first task TASK1 in operation S250, and transmits the write data WDATA related to the first task TASK1 to the eMMC 300C in operation S260. In response to the write execution command CMD47, the eMMC 300C receives and stores the write data WDATA in the buffer memory 327, and sends a program command to the flash memory 370A, so that the write data WDATA is programmed to the flash memory 370A.

After the first task TASK1 is executed, the bit corresponding to the first task TASK1 in the status register 313A may be reset to "not-ready" (e.g., "0"). The task manager 315 checks the status of the tasks stored in the command storage unit 311, and updates a bit corresponding to the second task TASK2 to "ready (e.g., "1"). Then, the eMMC 300C drives the ready signal QRDY to the low level in operation S265.

In response to the ready signal QRDY at the low level, the host 200C transmits the status check command Q_CHECK to the eMMC 300C in operation S270 to check the status in the status register 313A. In response to the status check command Q_CHECK, the eMMC 300C transmits the status response message Q_STATUS, which includes values of the status register 313A, to the host 200C in operation S280.

Once the host 200C confirms that the second task TASK2 is ready from the status response message Q_STATUS received in operation S280, the host 200C sends the eMMC 300C a second execution command including the read execution command CMD46 for the second task TASK2 in operation S290. In response to the read execution command CMD46, the eMMC 300C transmits read data RDATA related to the second task TASK2 to the host 200C in operation S295.

Figure 9:
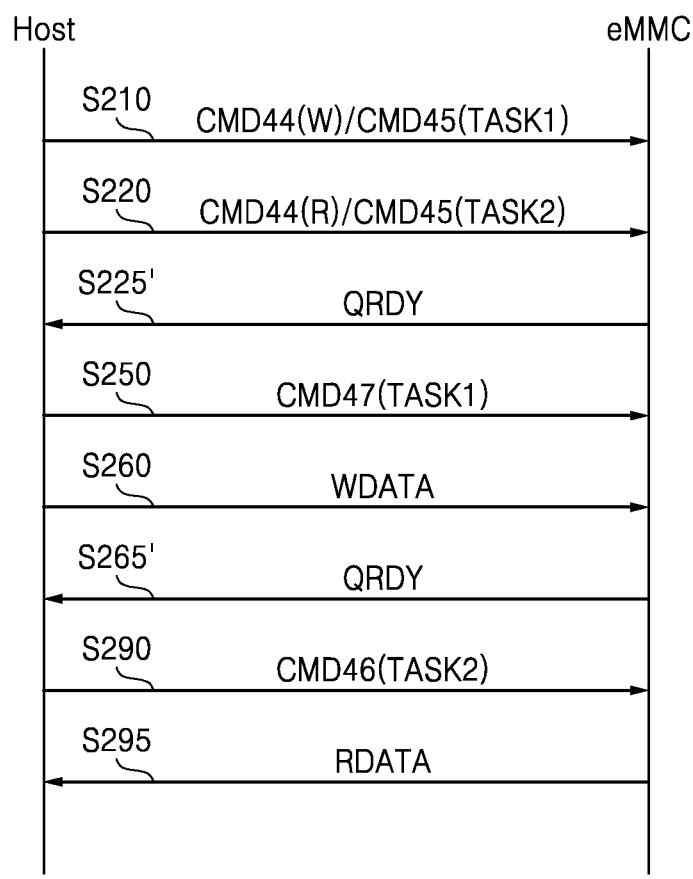
FIG. 9 is a flowchart of a method of operating an eMMC, according to other embodiments of the inventive concept.
Figure 11:
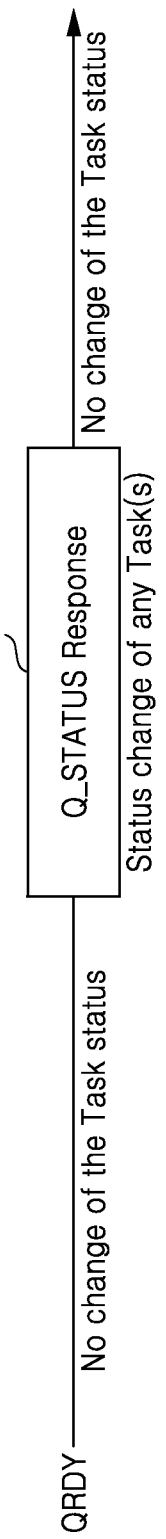
FIG. 11 is a timing chart of a ready signal, according to other embodiments of the inventive concept.

FIG. 9 is a flowchart of a method of operating the eMMC 300C, according to embodiments of the inventive concept. FIG. 11 is a timing chart of the ready signal QRDY, according to the embodiments of the inventive concept. The method illustrated in FIG. 9 is similar to that illustrated in FIG. 8. Thus, the following discussion focuses mainly on the differences between the methods to avoid redundancy.

The ready signal QRDY illustrated in FIG. 10 is driven to the low level when the status register 313A is updated. However, the ready signal QRDY illustrated in FIG. 11 includes the status response message Q_STATUS. The status response message Q_STATUS includes bit values of the status register 313A. In other words, the bit values of the status register 313A are contained in the ready signal QRDY transmitted through the separate ready signal channel 105.

Referring to FIG. 11, whenever any of the values of the status register 313A is updated, the eMMC 300C transmits the ready signal QRDY including the values of the status register 313A to the host 200C through the ready signal channel 105. Then, the host 200C immediately detects the ID of a ready task from the ready signal QRDY. Therefore, the host 200C does not need to send the status check command Q_CHECK to the eMMC 300C through the command channel to check the values of the status register 313A.

Referring to FIGS. 9 and 11, once the host 200C confirms that the first task TASK1 is ready based on the ready signal QRDY received in operation S225', the host 200C sends the eMMC 300C the write execution command CMD47 for the first task TASK1 in operation S250, and transmits the write data WDATA related to the first task TASK1 to the eMMC 300C in operation S260.

Once the host 200C confirms that the second task TASK2 is ready from the ready signal QRDY received in operation S265', the host 200C sends the eMMC 300C the read execution command CMD46 for the second task TASK2 in operation S290. In response to the read execution command CMD46, the eMMC 300C transmits the read data RDATA related to the second task TASK2 to the host 200C in operation S295.

Figure 12:
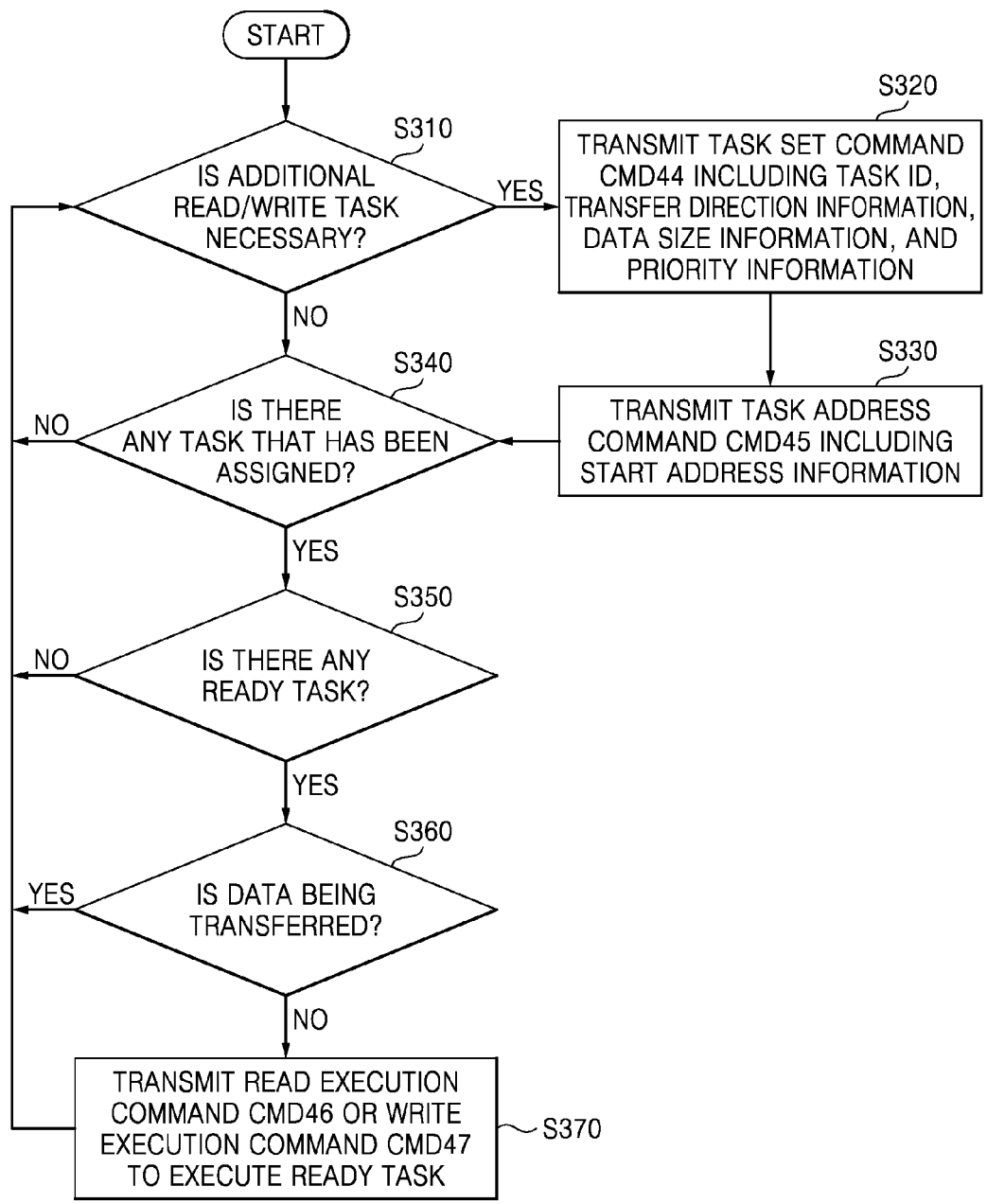
FIG. 12 is a flowchart of a method of operating a host, according to embodiments of the inventive concept.

FIG. 12 is a flowchart of a method of operating the host 200A or 200C, according to embodiments of the inventive concept. Referring to FIG. 12, the host 200A or 200C (hereinafter, collectively referred to by reference number 200) determines whether an additional read/write task is necessary in operation S310. When it is determined that an additional read/write task is necessary (S310: YES), the host 200 sets the task and a start address of the task in operations S320 and S330, respectively. More particularly, the host 200 sets task information, e.g., including a ID, transfer direction information, data size information and priority information of the task, and transmits the task set command CMD44 including the task information to the eMMC 300A, 300B, or 300C (hereinafter, collectively referred to by reference number 300) in operation S320. The host 200 transmits the task address command CMD45, e.g., including the start address information, to the eMMC 300 in operation S330. Thus, the task is assigned to the eMMC 300.

When it is determined that an additional read/write task is not necessary (S310: NO), the host 200 determines whether there is any task that has been assigned to the eMMC 300 in operation S340. When it is determined that there is a task(s) assigned to the eMMC 300 (S340: YES), the host 200 checks whether there is any task that is ready for execution, that is, whether there is any ready task among the assigned tasks, in operation S350. Methods of checking whether there is any ready task will be described in detail with reference to FIGS. 13A through 13B, below.

When there is a ready task(s) (S350: YES), the host 200 determines whether any data is being transferred in operation S360. When it is determined that no data is being transferred (S360: NO), the host 200 executes the ready task to be executed in operation S370. For instance, the host 200 may issue the read execution command CMD46 or the write execution command CMD47 to the eMMC 300 with respect to the ready task to execute the ready task in operation S370. When it is determined that no tasks are assigned to the eMMC 300 (S340: NO), that there are no ready tasks (S350: NO), or that data is being transferred (S360: YES), the process returns to operation S310.

Figure 13A:
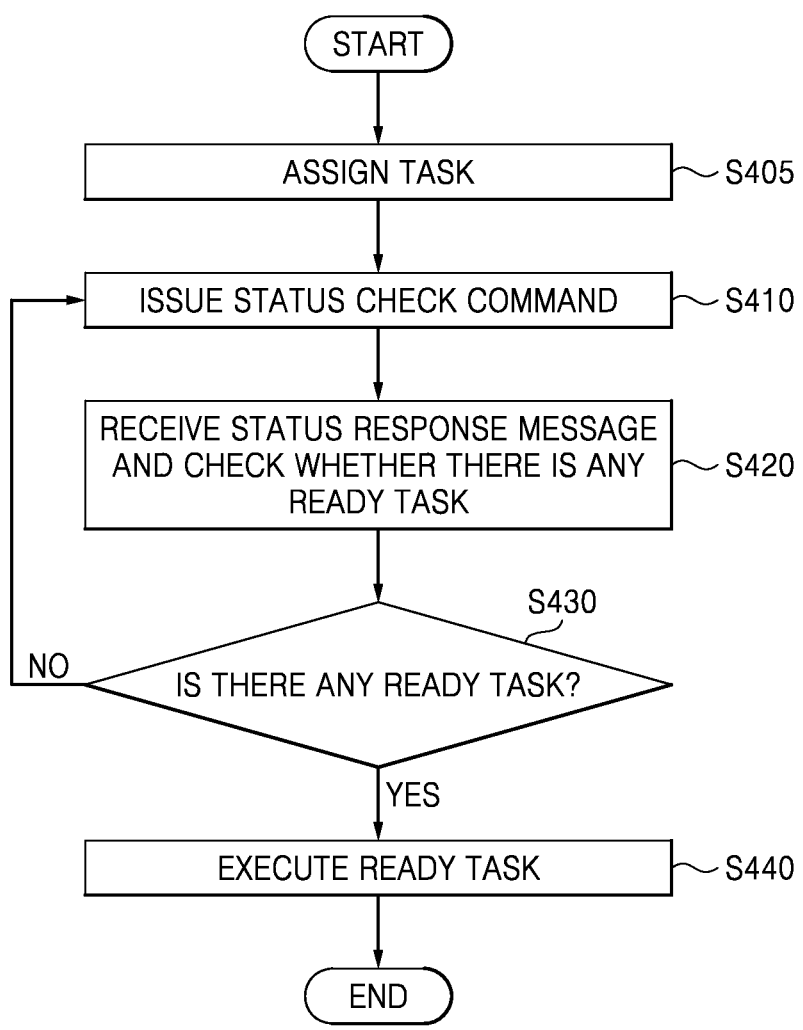
FIG. 13A through 13C are flowcharts of a method of operating a host, according to other embodiments of the inventive concept.
Figure 13B:
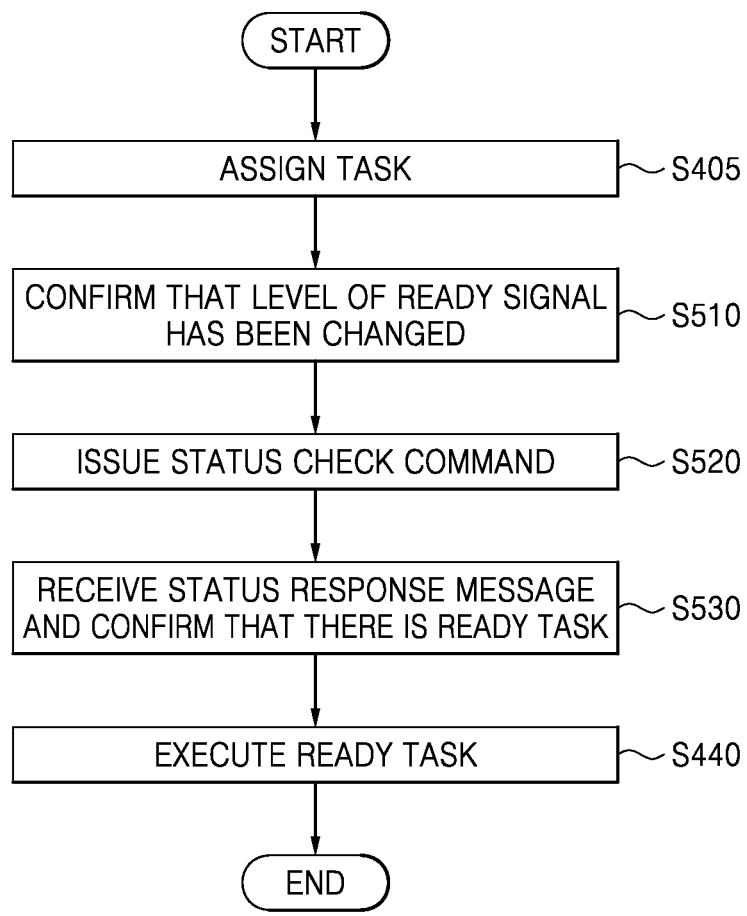
Figure 13C:
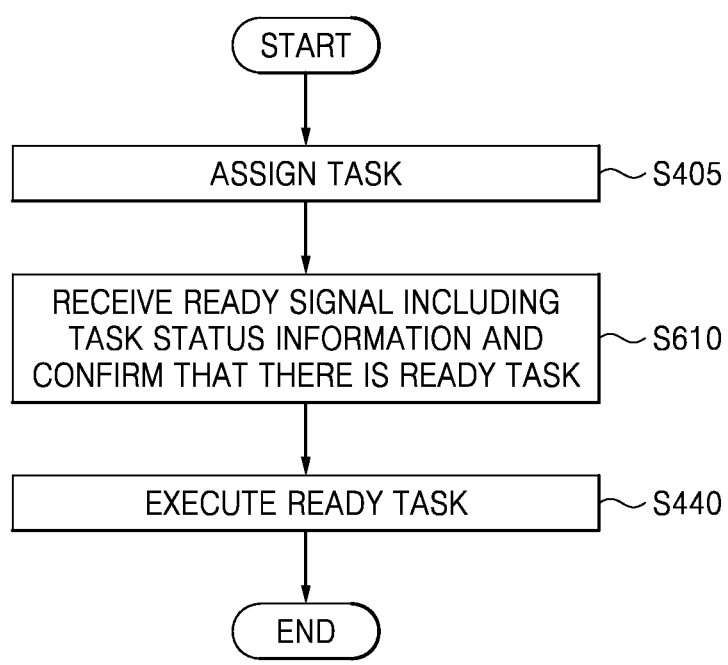

FIG. 13A through 13C are flowcharts of a method of operating the host 200, according to embodiments of the inventive concept.

Referring to FIG. 13A, the host 200 assigns a task to the eMMC 300 in operation S405. Operation S405 may correspond to operations S310 through S330 illustrated in FIG. 12, for example. Thereafter, the host 200 checks whether the assigned task is ready for execution in operations S410 through S430. In particular, the host 200 periodically or non-periodically issues a status check command to the eMMC 300 to obtain status information stored in the status register 313A in operation S410. The host 200 receives a status response message from the eMMC 300 and checks whether there is any ready task in operation S420. When there is any ready task (S430: YES), the host 200 executes the ready task in operation S440. When there is no ready task (S430: NO), the process returns to operation S410 to issue another status check command.

Referring to FIG. 13B, the host 200 assigns a task to the eMMC 300 in operation S405. Thereafter, the host 200 checks whether the assigned task is ready for execution in operations S510 through S530. In particular, the host 200 waits until it confirms that the level of the ready signal QRDY transmitted from the eMMC 300 has been changed in operation S510. For instance, the host 200 checks the ready signal QRDY to confirm that the ready signal QRDY transitions from a first level (e.g., the high level) to a second level (e.g., the low level) in operation S510. When it is confirmed that the level of the ready signal QRDY has been changed, the host 200 issues a status check command to the eMMC 300 to obtain status information stored in the status register 313A in operation S520. The host 200 receives a status response message from the eMMC 300, and confirms whether there is a ready task in operation S530. When there is a ready task, the host 200 enables the ready task to be executed in operation S440.

Referring to FIG. 13C, the host 200 assigns a task to the eMMC 300 in operation S405. Thereafter, the host 200 checks whether the assigned task is ready for execution in operation S610. In particular, the host 200 waits for the ready signal QRDY, including status information of each task in the form of a packet, to be received from the eMMC 300 in operation S610. For instance, when any bit value in the status register 313A is updated, the eMMC 300 may transmit the ready signal QRDY including the bit values of the status register 313A to the host 200, and the host 200 detects status information from the ready signal QRDY and confirms that there is a ready task in operation S610. When there is a ready task, the host 200 enables the ready task to be executed in operation S440.

Figure 14:
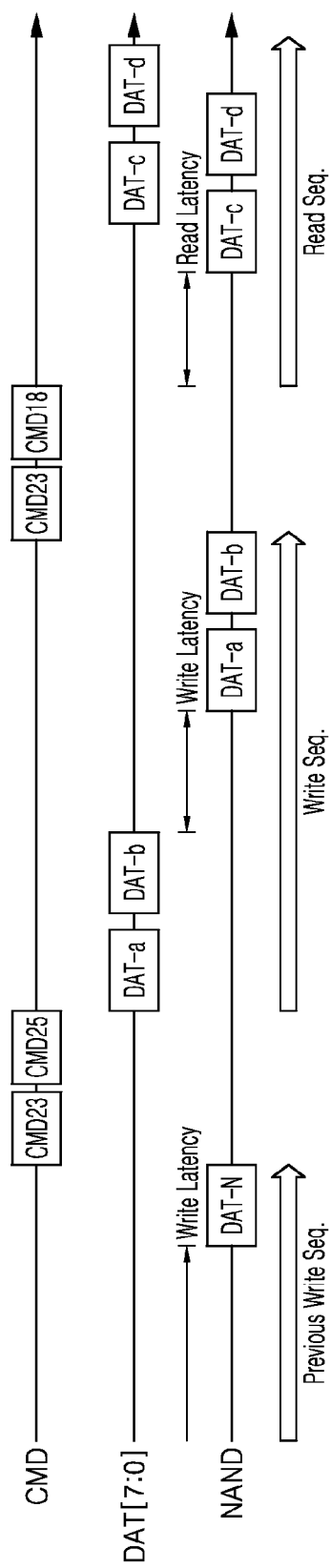
FIGS. 14 and 15 are schematic timing charts for comparison between a conventional method of operating an eMMC and a method of operating an eMMC, according to embodiments of the inventive concept.
Figure 15:
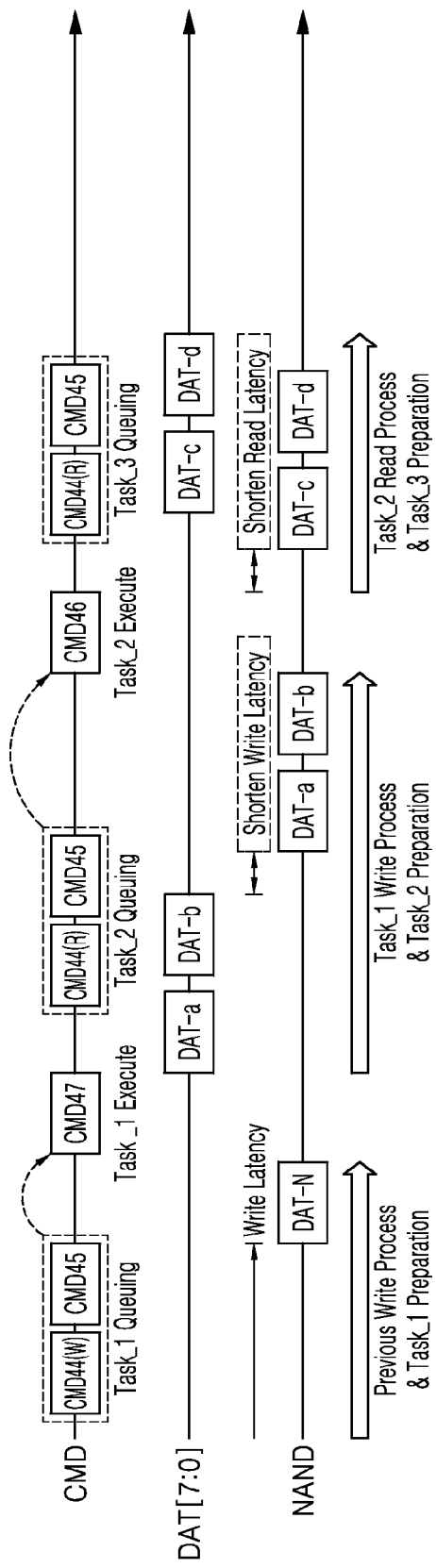

FIGS. 14 and 15 are schematic timing charts for comparison between a conventional method of operating an eMMC and a method of operating an eMMC according to embodiments of the inventive concept. FIG. 14 illustrates the conventional method of operating the eMMC, and FIG. 15 illustrates a method of operating the eMMC according to embodiments of the inventive concept.

Referring to FIG. 14, until previous DAT-N is stored in flash memory, a host cannot send the flash memory a command for data reading or writing, except for particular commands, such as a stop command or an abort command for stopping a previous command. The host can send the eMMC normal data write commands CMD23 and CMD25 only after a write sequence of the previous DAT-N is completed.

The eMMC receives data DAT-a and DAT-b related to the normal data write commands CMD23 and CMD25 from the host, and writes the data DAT-a and DAT-b to flash memory in response to the normal data write commands CMD23 and CMD25. At this time, the host cannot send the eMMC another command (i.e., a normal data write command or a normal data read command) until a write sequence of the data DAT-a and DAT-b is completed. After the write sequence of the data DAT-a and DAT-b is completed, the host sends the eMMC normal data read commands CMD23 and CMD18.

The eMMC reads data DAT-c and DAT-d related to the normal data read commands CMD23 and CMD18 from the flash memory, and transmits the data DAT-c and DAT-d to the host in response to the normal data read commands CMD23 and CMD18. After sending the normal data read commands CMD23 and CMD18 to the eMMC, the host must stand by until the data DAT-c and DAT-d is received from the eMMC.

In comparison, referring to FIG. 15, while data is being transferred or before the write sequence of the previous DAT-N is completed, the host 200 is able to send the eMMC 300 the task set command CMD44 and the task address command CMD45 for the first task. The eMMC 300 stores first task information in the command storage unit 311 in response to the task set command CMD44 and the task address command CMD45 for the first task, and it prepares to execute the first task.

When the write sequence of the previous DAT-N is completed, the host 200 transmits the write execution command CMD47 to the eMMC 300 to execute the first task. The eMMC 300 receives the write data DAT-a and DAT-b related to the first task from the host 200, and programs the data DAT-a and DAT-b to flash memory in response to the write execution command CMD47.

The host 200 may issue the task set command CMD44 and the task address command CMD45 for the next task, i.e., the second task to the eMMC 300, even while the write data DAT-a and DAT-b related to the first task are being transferred or before the write data DAT-a and DAT-b are completely programmed to the flash memory. The eMMC 300 stores second task information in the command storage unit 311 in response to the task set command CMD44 and the task address command CMD45 for the second task, and it prepares to execute the second task.

When the write sequence of the write data DAT-a and DAT-b related to the first task is completed, the host 200 transmits the read execution command CMD46 to the eMMC 300 to execute the second task. The eMMC 300 may read the read data DAT-c and DAT-d related to the second task from the flash memory and transmit the read data DAT-c and DAT-d to the host 200 in response to the read execution command CMD46. While the read data DAT-c and DAT-d related to the second task are being transferred, the host 200 may issue the task set command CMD44 and the task address command CMD45 for the next task, i.e., the third task to the eMMC 300.

Figure 16:
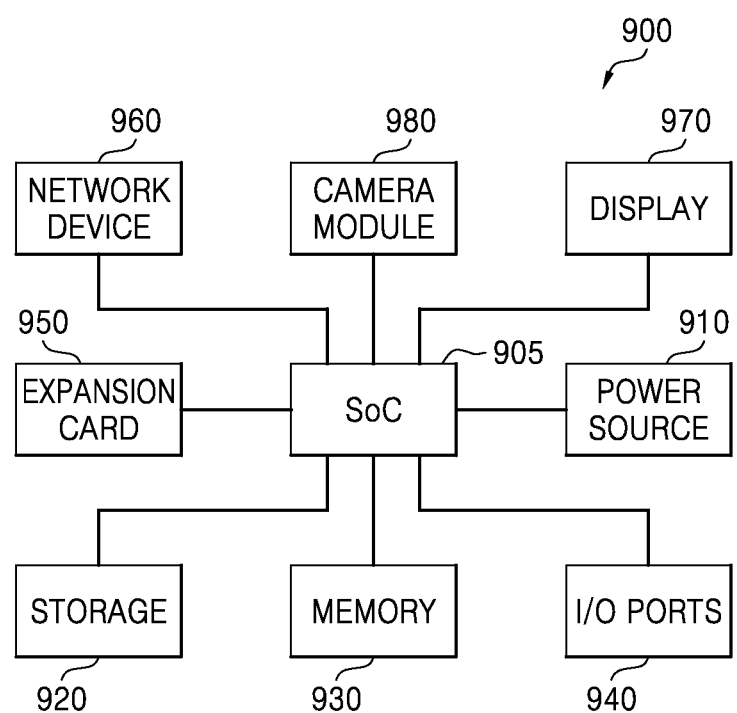
FIG. 16 is a block diagram of an electronic system 900, according to embodiments of the inventive concept.

FIG. 16 is a block diagram of an electronic system 900, according to embodiments of the inventive concept. Referring to FIG. 16, the electronic system 900 may be implemented as a personal computer (PC), a data server, or a portable device, for example. The portable device may be a laptop computer, a cellular phone, a smart phone, a tablet PC, a personal digital assistant (PDA), an enterprise digital assistant (EDA), a digital still camera, a digital video camera, a portable multimedia player (PMP), portable navigation device (PND), a handheld game console, an e(electronic)-book device, or the like.

The electronic system 900 includes a system on chip (SoC) 905, a power source 910, storage 920, memory 930, I/O ports 940, an expansion card 950, a network device 960, and a display 970. According to various embodiments, the electronic system 900 may further include a camera module 980.

The SoC 905 may function as the host 100A illustrated in FIG. 1 or the host 100C illustrated in FIG. 7. The SoC 905 controls the operation of at least one of the elements 910 through 970.

The power source 910 supplies an operating voltage to at least one of the elements 905, and 920 through 970. The storage 920 may store programs or data, and may be implemented as a hard disk drive (HDD) or a solid state drive (SSD), for example. The storage 920 may be implemented as the eMMC 200A, 200B or 200C.

The memory 930 may store programs or data. The memory 930 may be implemented as a volatile or non-volatile memory, for example. A memory controller (not shown) that controls data access operations, e.g., read operations, write operations (or program operations), and/or erase operations, on the memory 930 may be integrated into or embedded in the SoC 905. Alternatively, the memory controller may be provided between the SoC 905 and the memory 930. When the memory 930 is the non-volatile memory, the memory 930 may be implemented as the eMMC 200A, 200B or 200C.

The I/O ports 940 are ports that receive data transmitted to the electronic system 900 or transmit data from the electronic system 900 to an external device. For instance, the I/O ports 940 may include a port connecting with a pointing device, such as a computer mouse, a port connecting with a printer, a port connecting with a USB drive, or the like.

The expansion card 950 may be implemented as a secure digital (SD) card or a multimedia card (MMC), for example. The expansion card 950 may be a subscriber identity module (SIM) card or a universal SIM (USIM) card, for example.

The network device 960 enables the electronic system 900 to be connected to a wired or wireless network. The display 970 displays data output from the storage 920, the memory 930, the I/O ports 940, the expansion card 950, and/or the network device 960.

The camera module 980 converts optical images into electrical images. Accordingly, the electrical images output from the camera module 980 may be stored in the storage 920, the memory 930, and/or the expansion card 950. Also, the electrical images output from the camera module 980 may be displayed through the display 970.

As described above, according to various embodiments of the inventive concept, an eMMC includes a plurality of command registers and enables a host to issue commands, e.g., task set command CMD44 and task address command CMD45, even during data transfer, so that a subsequent task can be prepared in advance. Accordingly, the eMMC is able to perform an internal operation for subsequent data transfer while current data transfer is being performed, thereby enhancing parallelism and reducing latency that may occur when a write or read operation is actually performed.

In addition, the host is able to send a subsequent read/write command to the eMMC regardless of the state of a data bus, e.g., even during data transfer or data programming, so that the eMMC can perform a preparatory operation for the subsequent read/write command even during the current data transfer. As a result, the read/write performance of the eMMC is increased.

Furthermore, the eMMC actively provides the host task status information, thereby reducing polling overhead of the host. As a result, performance loss is reduced in the system.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

The invention claimed is:

1. An embedded multimedia card (eMMC) device, comprising:
    a flash memory; and
    a device controller configured to communicate with the flash memory and a host, the device controller comprising:
        a command storage unit configured to receive and store commands from the host, regardless of a state of a data bus between the device controller and the host, the commands relating to execution of a task;
        a status storage unit configured to store statuses corresponding to the tasks of the commands stored in the command storage unit; and
        a task manager configured to manage the command storage unit and the status storage unit for implementation of operations based on the tasks stored in the command storage unit and the corresponding statuses of the tasks stored in the status storage unit.

2. The device of claim 1, wherein each task comprises a queuing command and an execution command.

3. The device of claim 2, wherein the queuing command comprises a task set command and a task address command.

4. The device of claim 3, wherein the task set command provides at least one of a task ID, a data direction of operation, a block count of the queued task, and priority.

5. The device of claim 2, wherein the execution command comprises one of an execute read operation for causing data to be read from the flash memory, an execute write operation for causing data to be written to the flash memory, a queue management operation for causing execution of a predefined operation, and a send status operation for providing the status of the task.

6. The device of claim 1, wherein the device controller further comprises:
    a data transfer manager configured to manage flow of data between the host and the flash memory via the data bus,
    wherein the task manager is further configured to control the data transfer manager based on the tasks stored in the command storage unit and the statuses corresponding to the tasks stored in the status storage unit.

7. The device of claim 6, wherein the device controller further comprises:
    a command decoder configured to decode the commands received from the host via a command/response bus to detect the commands relating to the execution of the task, to direct the commands relating to the execution of the task to the command storage unit, and to transmit other decoded commands to the data transfer manager.

8. The device of claim 1, wherein the task manager is further configured to control an order of execution of the tasks corresponding to the commands stored in the command storage unit using priority information and transfer direction information of the tasks.

9. The device of claim 1, wherein the command storage unit comprises a plurality of command registers, and task information corresponding to each of the tasks is stored in a corresponding command register of the plurality of command registers.

10. The device of claim 2, wherein the device controller is configured send a queue ready signal indicating the status of the queuing command as a ready status, the status being stored in the status storage unit, and
    wherein the device controller subsequently receives an execution command from the host corresponding to the queuing command.

11. The device of claim 10, wherein the device controller is configured to send the queue ready signal on a dedicated ready signal channel connected between the device controller and the host.

12. A method of operating an embedded multimedia card (eMMC) device configured to communicate with a host, the method comprising:
- receiving a first queuing command from the host relating to a first task to be performed by the eMMC device, wherein the first queuing command is received regardless of a state of a data bus for communicating data between the eMMC device and the host;
- storing the first queuing command in a command storage unit;
- storing a status of the first task in a status storage unit;
- receiving an execution command from the host for executing the first task when the status of the first task indicates that the first task is ready for execution; and
- executing the first task in response to the execution command.

13. The method of claim 12, further comprising:
- receiving a second queuing command from the host relating to a second task to be performed by the eMMC device, wherein the second queuing command is received regardless of the state of the data bus for communicating data between the eMMC device and the host, and regardless of the status of the first task;
- storing the second queuing command in the command storage unit;
- storing a status of the second task in the status storage unit;
- receiving an execution command from the host for executing the second task when the status of the second task indicates that the second task is ready for execution; and
- executing the second task in response to the execution command.

14. The method of claim 13, wherein the first queuing command is stored in a first command register and the second queuing command is stored in a second command register of the command storage unit.

15. The method of claim 14, wherein the status of the first task is indicted by a first bit and the status of the second task is indicated by a second bit in a status register of the status storage unit.

16. The method of claim 13, wherein the first queuing command of the first task comprises a first task set command and a first task address command, and the second queuing command of the second task comprises a second task set command and a second task address command.

17. A method of operating an embedded multimedia card (eMMC) device configured to communicate with a host, the method comprising:
- receiving a plurality of queuing commands from the host relating to a corresponding plurality of tasks to be performed by the eMMC device, wherein the queuing commands are received regardless of a state of a data bus for communicating data between the eMMC device and the host;
- storing the plurality of queuing commands in a command storage unit;
- storing a plurality of statuses of the plurality of tasks, corresponding to the plurality of queuing commands, in a status register;
- detecting an updated status value of the plurality of statuses stored in the status register, indicating a ready status of the corresponding task of the plurality of tasks;
- sending a ready signal in response to the detected updated status value to the host;
- receiving an execution command from the host in response to the ready signal for executing the task having the ready status; and
- executing the task having the ready status in response to the execution command.

18. The method of claim 17, wherein the ready signal is transmitted on a dedicated ready signal channel connected between the eMMC device and the host.

19. The method of claim 17, wherein the ready signal includes values of the plurality of statuses, enabling the host to detect the updated status value and thus the task having the ready status.

20. The method of claim 17, further comprising:
- receiving a status check command from the host in response to the ready signal for checking the status register to determine which of the plurality of statuses has the updated status value; and
- sending a status response message in response to the status check command, the status response message including values of the plurality of statuses, enabling the host to detect the updated status value and thus the task having the ready status.

21. The method of claim 16, further comprising:
- controlling an order of executing the first task and the second task using priority information in each of the first task set command and the second task set command.

22. The method of claim 16, further comprising:
- controlling an order of executing the first task and the second task using transfer direction information in each of the first task set command and the second task set command.

* * * * *